Patented July 19, 1932

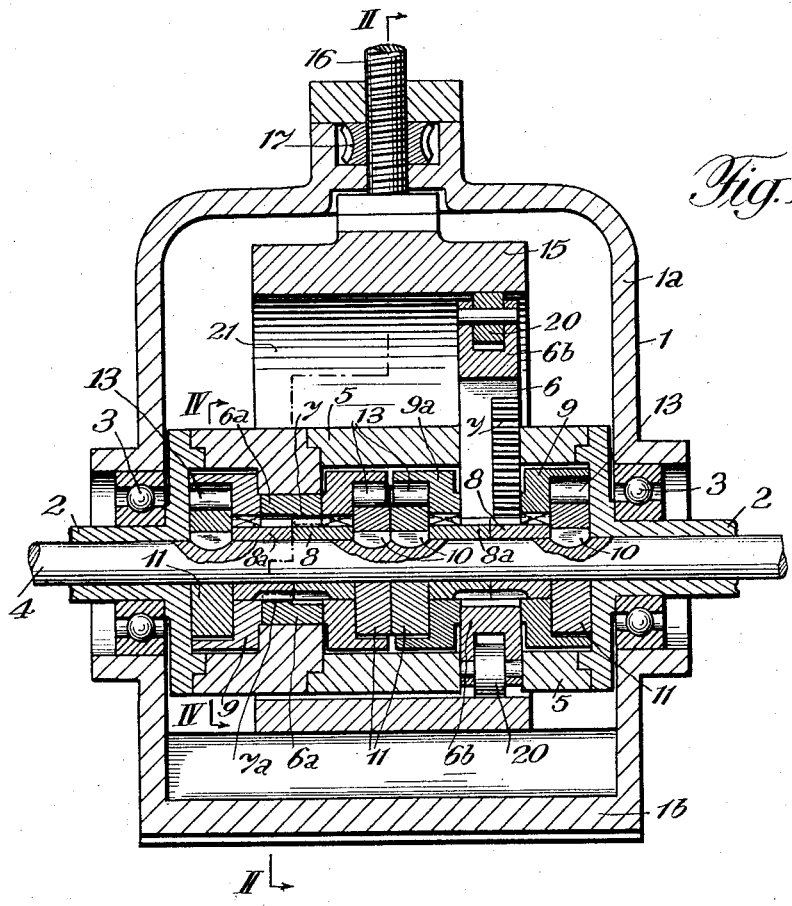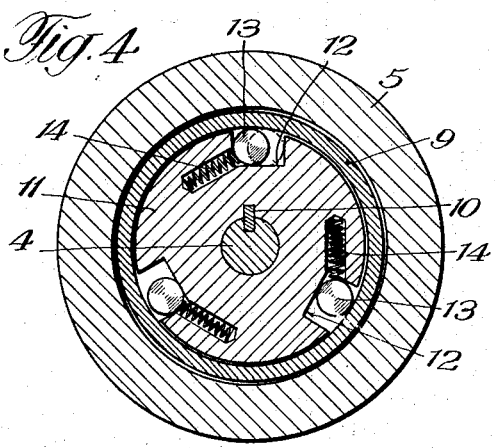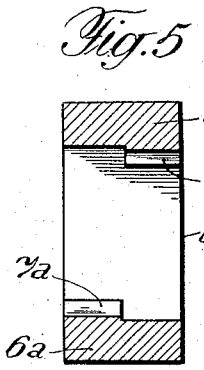

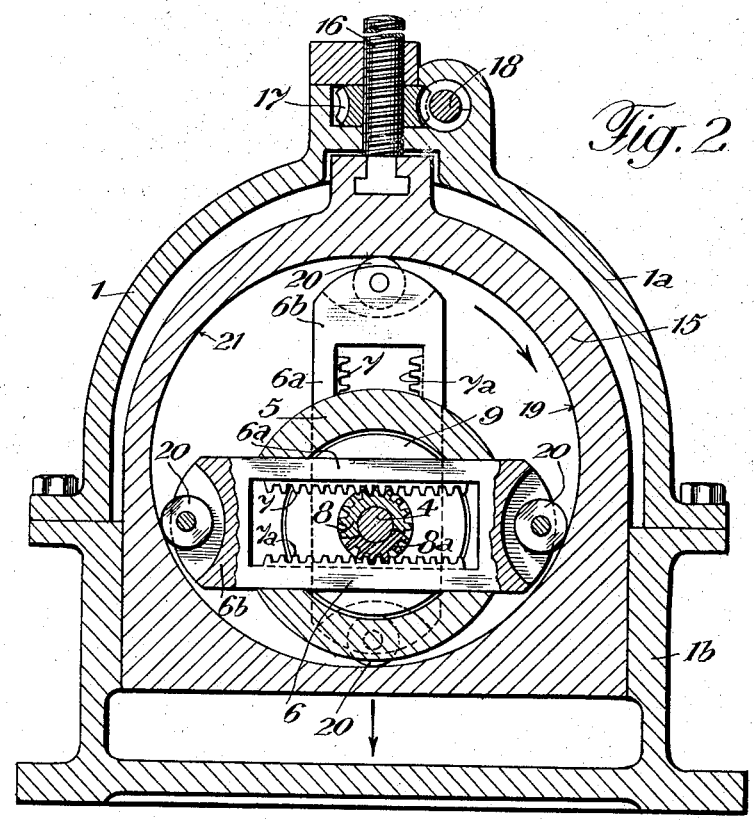
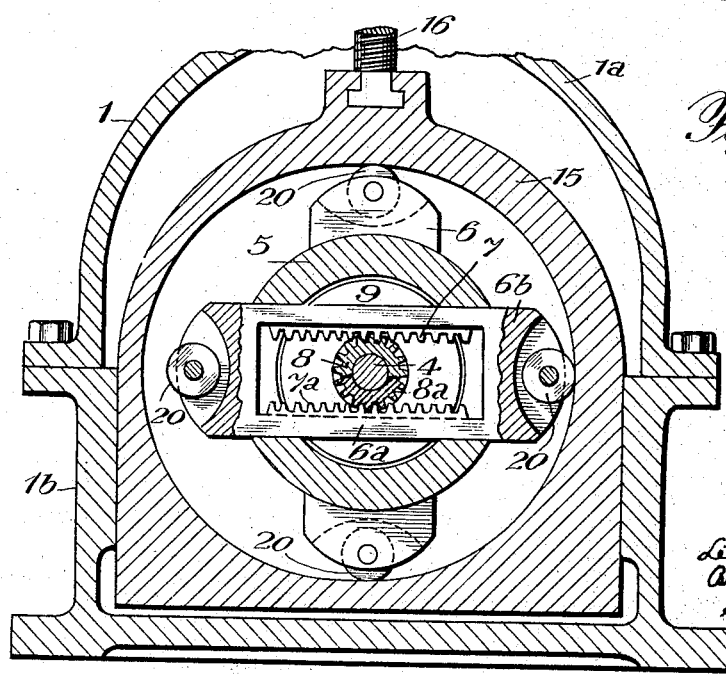

1,868,196

UNITED STATES PATENT OFFICE

LÉON JACOT-DESCOMBES, OF TAVANNES, SWITZERLAND

CHANGE SPEED GEAR

Application filed June 11, 1931, Serial No. 543,707, and in Switzerland June 20, 1930.

This invention relates to change speed gears adapted for progressively varying the ratio of gearing and comprising a guide member eccentrically displaceable relatively to the drive shaft, said guide member cooperating with reciprocatory rack rails rotatably mounted in pairs in crossed relation of said pairs and meshing with gear wheels acting on the driven shaft concentrically arranged with the driving shaft through the intermediary of gripping appliances.

Driving gears of this type have been heretofore proposed wherein the guide member was constructed as a central body displaceably arranged on the drive shaft. This arrangement had mechanical drawbacks limiting its applicability as regards the power transmission since the working parts of the gear could not be enlarged to any desired size. Other known driving gears were provided with a stationary guide member but in their construction so many translation and other auxiliary members were involved that the efficiency of these gears was but small and the noise caused by the movable parts so great that the gears could not be successfully introduced into practice.

The object of the present invention is to obviate the aforesaid disadvantages by constructing the guide member as a fixed cage provided with a guideway having cylindrical sections for the rack rails arranged in pairs in a common frame to travel on with their ends by the aid of antifriction means and disposing the driven shaft inside the hollow drive shaft the portion of the latter which serves for guiding the rack rails being formed as a drum which surrounds the gear wheels mounted on the driven shaft.

This arrangement affords a robust and stable construction which due to its simplicity is of a high efficiency and which operates practically noiseless as out of the rack and gear devices no other gear teeth are employed.

In the drawings a constructional form of the invention is illustrated, by way of example only, in which Fig. 1 is a vertical axial section through the driving gear;

Figs. 2 and 3 are sections on the line II—II in Fig. 1 showing the parts in different positions;

Fig. 4 is a section on the line IV—IV in Fig. 1, on a larger scale, and

Fig. 5 an enlarged section of a pair of rack rails combined in a frame.

The whole assembly of the driving gear is arranged inside a casing 1 made in two parts $1a$ and $1b$ that are screwed together. The drive shaft 2 mounted in ball bearings 3 is constructed as a hollow shaft which extends throughout the casing and surrounds the driven shaft 4. In the interior of the casing the drive shaft is formed in a hollow drum 5 which is provided with two guide portions perpendicularly disposed to the axis of the gearing and shifted 90° relatively to each other. In these guide portions the frames comprising the rack rails are displaceably arranged transversely of the axis in the manner of slides that rotate in unison with the drum 5. The contour of the cross-section of these slides is rectangular and they comprise two longitudinal bars $6a$ which are interconnected at their ends by cross-bars $6b$. The inner faces of the bars $6a$ are provided with gear teeth 7 and $7a$ respectively the width of which amounts to half the width of said bars. These two toothed portions constitute the rack rails and are disposed symmetrically to each other with respect to both longitudinal middle planes of the slide (Fig. 5). Each rack rail 7 and $7a$ respectively meshes with one of the gear wheels 8, $8a$ which are mounted on the shaft 4 so as to be free to turn thereon. Every wheel 8, $8a$ is rigidly connected to a dish-shaped member 9 in the counter-bore of which a gripping appliance which is effective in one direction of rotation only is housed. This gripping appliance comprises a disk 11 secured on the shaft 4 by means of a wedge 10 and provided in its circumference with 3 recesses 12 each of which accommodates a gripping roller 13. The bottom of the recesses 12 is so formed that the rollers 13 acted upon by springs 14 get jammed between the bottom of the recess and the inner circumference of the counter-bore of the dish-shaped member 9, whereby when said member is turned to the right in Fig. 4 on the disk 11 the latter is driven in the same direction and the shaft 4 together with it. On turning the dish-shaped member to the left the rollers 13 are moved against the action of their correlated springs to the left also and due to the clearance afforded to them in the recesses in this position the disk remains at standstill. A fixed cage 15 guided in the lower part 1b of the casing is arranged to encircle the drum 5 and adapted to be raised and lowered in the casing by means of a reduction gearing comprising a screw spindle 16 connected to the cage, a nut 17 in the form of a worm wheel, and a worm 18. The cage is formed with a large bore providing an annular guide way, the one half 19 of which (right hand side in Fig. 2) serves for guiding the ends of the slides equipped with rollers 20. The left half 21 of the bore is sufficiently relieved to afford clearance for the slide.

The operation of the described change speed gear is as follows:

When the drive shaft 2 is rotating clockwise (Figs. 2 and 3) the drum 5 is moved together with it as well as the two slides 6. Assuming that the guide member is moved at first, as shown in Fig. 2, to its extreme eccentrical position with respect to the drive shaft 2. In the arrangement illustrated this eccentricity corresponds to five times the tooth pitch of the rack teeth. During rotation to the right, the slides 6 by virtue of the cylindrical section 19 of the guideway on the cage 15 are compelled to shift to the left in the respective guide portions in the drum 5, thus turning the gear wheels 8, 8a by means of the rack rails 7 and 7a respectively. The two gripping appliances are so designed that they are effective only when the gear wheels turn to the left on the shaft 4 when looking from in front of Fig. 4. During the shifting movement of the slides 6 thus only the gripping appliances cooperating with the gear wheels 8 are operative and the gripping appliances cooperating with the gear wheels 8a rendered inoperative. Upon the termination of half a turn the end of the slide controlled by the guideway rides off the section 19 of the same and the other end enters in engagement therewith so that on the completion of a full turn each slide performs a whole reciprocating in its guide portion, whereby the gear wheels 8 and 8a and their correlated clamping appliances are respectively rendered operative for driving shaft 4 successively in the same direction of rotation.

Under the assumption that the maximum eccentricity corresponds to a length of the rack rail equal to five times the tooth pitch it is evident that during half a revolution of the drive shaft 2 the slide performs a single throw equal to ten times the tooth pitch. Now, as the gear wheel is provided with sixteen teeth it is moved during half a turn to the right of the drive shaft through an angular movement to the left amounting to $^{10}/_{16}$ or $5/_8$ of a full revolution of the driven shaft. Therefore, when for example the drive shaft runs at 160 revolutions per minute in the direction to the right, the driven shaft will in the meantime run at forty revolutions per minute to the left. When the eccentricity is reduced to an amount equal to four times the tooth pitch the turning motions of the two shafts compensate each other with the result that the driven shaft remains at standstill. With the number of revolutions of the drive shaft again assumed to be 160 per minute it follows from the foregoing computation that with an eccentricity equal to the length of two or one tooth pitch respectively the driven shaft will run at 80 or 120 revolutions per minute respectively. With an eccentricity 0 (Fig. 3) the throw of the rack rails is zero and, consequently, the driven shaft will have the same speed as the drive shaft. Thus, the ratio of gearing of the change speed gear is a linear function of the eccentricity of the cylindrical guideway and adapted to be varied in wide limits.

When the arrangement is such that the gripping appliances are rendered operative by rotational movement of the gear wheels to the right, the speed caused by the latter adds to that of the drive shaft, so that by varying the eccentricity from zero to its maximum value the number of revolutions of the driven shaft is increased several times the speed of the drive shaft.

The described change speed gear is provided only with two rack rails combined in a frame. If it be desired to augment the uniformity of the translated speed the number of combined rack rails or frames may be correspondingly increased. With such an arrangement it is preferred to dispose the frames in peripherally offset relation at an angle which is equal to 180 degrees divided by the number of frames or slides.

It is obvious that the invention is not limited to the described gripping appliance, other designs for the same being feasible without departing from the principle of the invention.

I claim:

1. In a change speed gear adapted for progressively varying the ratio of gearing, in combination, a hollow drive shaft and a coaxial driven shaft, an annular guideway adapted to be fixed in various eccentric positions relatively to said drive shaft, at least one pair of rack rails interconnected at their ends to form opposite sides of a frame, guide means provided on the frame and adapted to cooperate with said fixed guideway, guide portions in said drive shaft for said frame to reciprocate transversely of said drive shaft by riding along said fixed guideway, gear wheels loosely mounted on said driven shaft, and adapted to cooperate with said rack rails, and gripping means interposed between said gear wheels and said driven shaft for actuating the latter.

2. In a change speed gear adapted for progressively varying the ratio of gearing, in combination, a hollow drive shaft and a coaxial driven shaft, an annular guideway adapted to be fixed in various eccentrical positions relatively to said drive shaft, several pairs of rack rails, each pair interconnected at their ends to form opposite sides of a frame, said frames disposed at equal angles relatively to each other, guide means provided on the frames and adapted to cooperate with said fixed guideway, guide portions in said drive shaft for said frames to reciprocate transversely of said drive shaft by riding along said fixed guideway, gear wheels loosely mounted on said driven shaft, each gear wheel cooperating with a rack rail of one of the frames, and gripping means interposed between said gear wheels and said driven shaft and adapted to alternately connect the gear wheels correlated to the same frame for moving the driven shaft in the same direction of rotation.

3. In a change speed gear adapted for progressively varying the ratio of gearing, in combination, a hollow drive shaft and a coaxial driven shaft, an annular guideway adapted to be fixed in various eccentrical positions relatively to said drive shaft, a hollow drum formed on said drive shaft, several pairs of rack rails, each pair interconnected at their ends to form opposite sides of a frame, said frames disposed at equal angles relatively to each other, antifrictional guide means provided on the frames and adapted to cooperate with said fixed guideway, guide portions in said hollow drum of said drive shaft for said frames to reciprocate transversely of said drive shaft by riding along said fixed guideway, gear wheels loosely mounted on said driven shaft, each gear wheel cooperating with a rack rail of one of the frames, a peripheral rim provided on each gear wheel, a notched disk secured on the driven shaft adjacent each gear wheel and a spring pressed gripping roller inserted in each notch of said disks, and adapted to alternately connect the gear wheels correlated to the same frame for moving the driven shaft in the same direction of rotation.

4. In a change speed gear adapted for progressively varying the ratio of gearing, is combination, a hollow drive shaft and a coaxial driven shaft, an annular guideway in the form of a cage adapted to be fixed in various eccentrical positions relatively to said drive shaft, a hollow drum formed on said drive shaft, a stationary casing enveloping said cage inclusive of said hollow drum, bearings in said casing for said drive shaft, guide members in said casing for said cage to slide on, a reduction gearing interposed between said casing and said cage for adjusting said annular guideway in its various eccentrical positions relatively to said drive shaft, at least one pair of rack rails interconnected at their ends to form opposite sides of a frame, guide means provided on the frames and adapted to cooperate with said fixed guideway, guide portions in said drive shaft for said frame to reciprocate transversely of said drive shaft by riding along said fixed guideway, gear wheels loosely mounted on said driven shaft and adapted to cooperate with said rack rails, and gripping means interposed between said gear wheels and said driven shaft for actuating the latter.

In testimony whereof I have signed my name to this specification.

LÉON JACOT-DESCOMBES.